June 8, 1926.
S. B. WINN
1,588,397
TRACTOR TRAILER LEG LIFT
Filed March 2, 1925    3 Sheets-Sheet 1
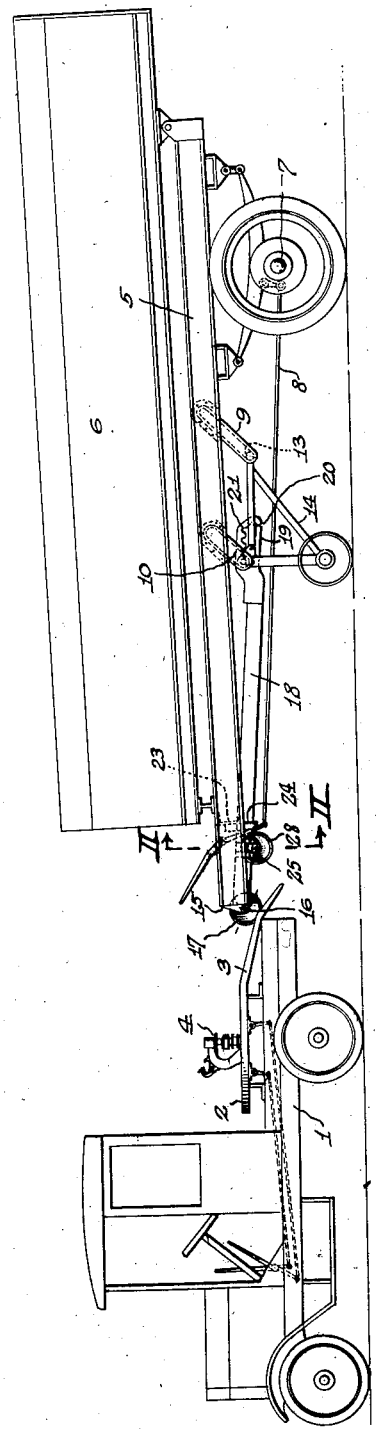
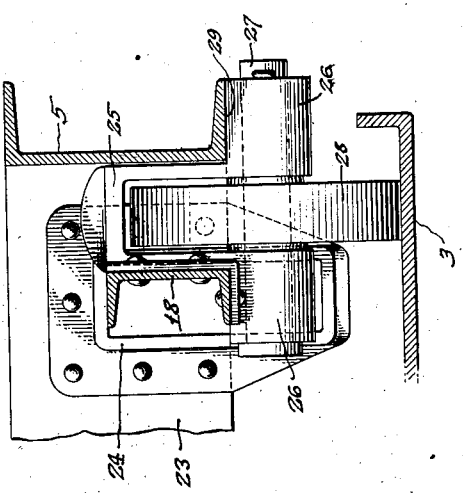
Inventor
Sidney B. Winn,
By
Attorneys June 8, 1926.
S. B. WINN
1,588,397
TRACTOR TRAILER LEG LIFT
Filed March 2, 1925   3 Sheets-Sheet 2
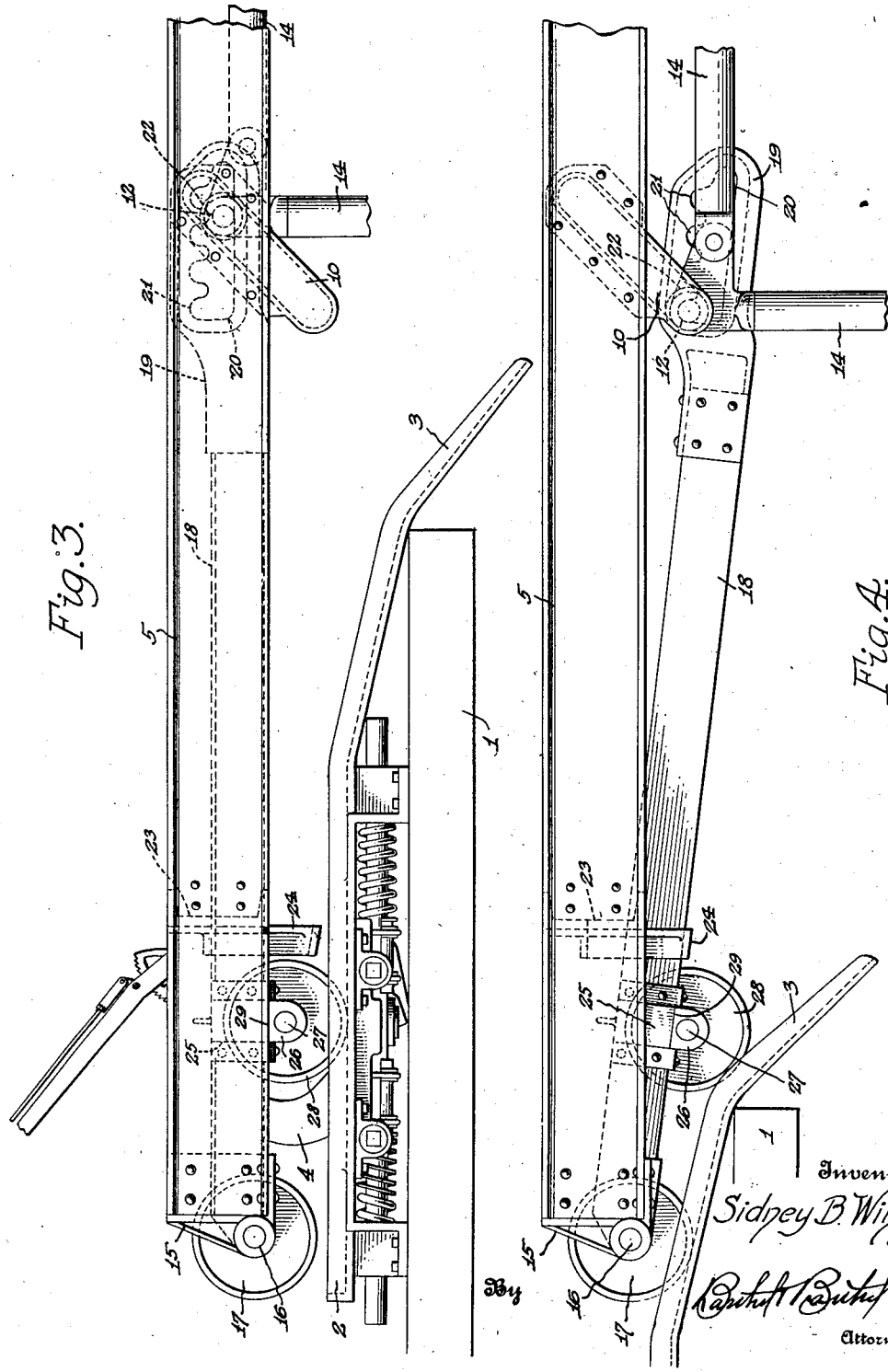

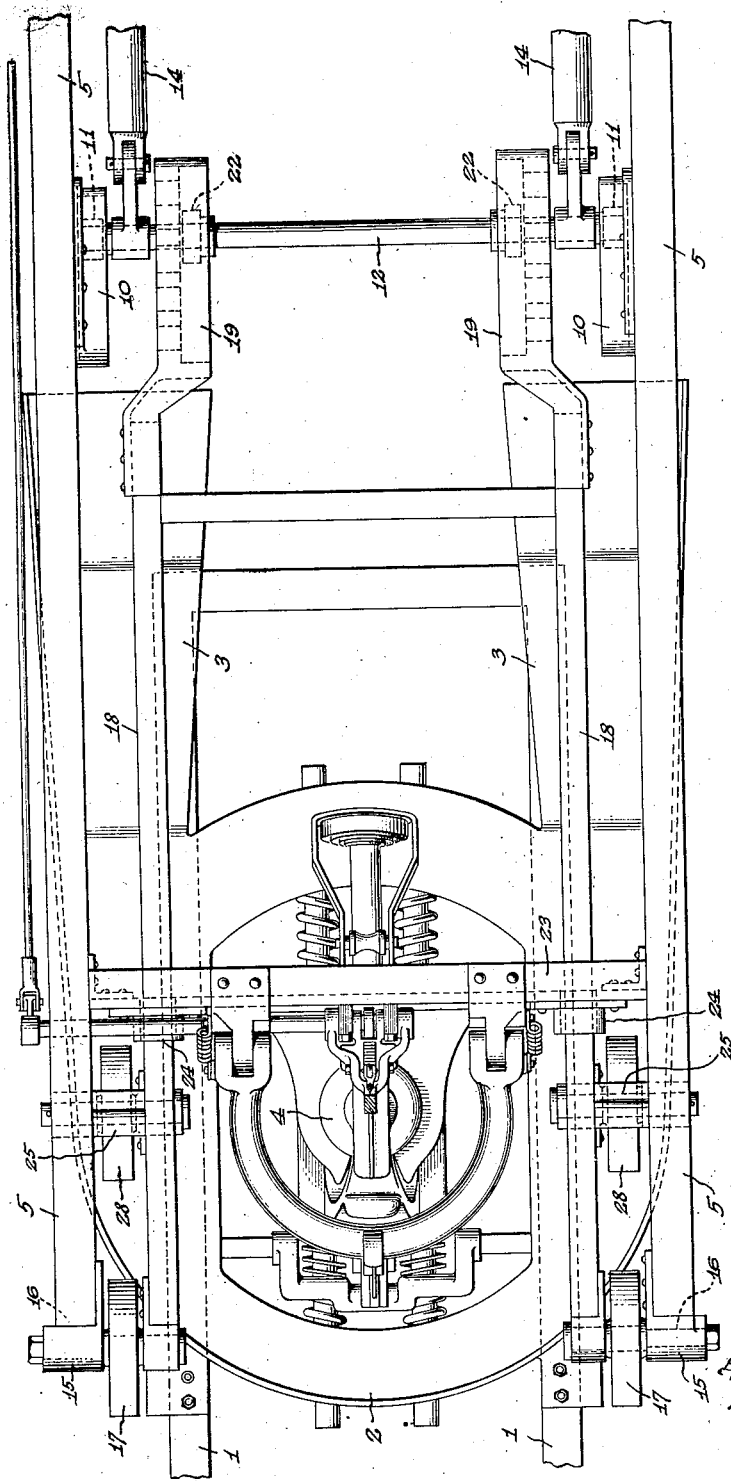

Patented June 8, 1926.

1,588,397

UNITED STATES PATENT OFFICE.

SIDNEY B. WINN, OF LAPEER, MICHIGAN.

TRACTOR-TRAILER LEG LIFT.

Application filed March 2, 1925. Serial No. 12,596.

This invention relates to leg supporting means for a tractor trailer combination wherein a tractor and trailer are coupled together for combined service and disengageable by uncoupling for independent service, and wherein the coupling and uncoupling operation are rendered active by a relative movement of the tractor and trailer in direction of traction, and wherein a shiftable supporting leg structure on the trailer provides for trailer service independent of the tractor. The tractor to which my invention is applicable includes, among other things, an inclined track leading to a turntable which serves as a member affording a fifth wheel action between the tractor and trailer. The trailer to which my invention is applicable, includes, among other things, a chassis having its rear end supported by a rear axle assembly including the usual wheels and brake mechanism. The forward end of the trailer chassis is adapted to be supported above and from the turntable of the tractor and such relation is established by backing the rear end of the tractor under the forward end of the trailer. The forward end of the trailer is also adapted to be supported, independent of the tractor, by a leg structure that may be raised by the tractor and lowered by gravity.

This invention aims to provide positive and reliable means, as will be hereinafter set forth, for raising the leg structure of the trailer when the rear end of the tractor backs under the forward end of the trailer, said means being positioned for engagement with the track and turntable of the tractor, so that initial engagement causes elevation of the trailer leg structure and further engagement support of the forward end of the trailer on the turntable of the tractor, such relation of parts providing a fifth wheel action for the tractor trailer combination and a relation which permits of the tractor and trailer being coupled or uncoupled incident to combined service or independent service.

My invention further aims to furnish a trailer with a supporting leg structure that has a rear portion movable at a predetermined angle to the trailer chassis and another portion movable in an arc relative to the trailer chassis, these leg structure portions being articulated so that one may operate the other and the angular moving portion automatically assume a locked or seated position which precludes slippage or displacement of the supporting leg structure, during independent service of the trailer, and particularly when under load and irregular road conditions.

My invention will be hereinafter specifically described and then claimed, and reference will now be had to the drawings, wherein Figure 1 is a side elevation, somewhat diagrammatic, of a tractor trailer combination in accordance with this invention, showing the tractor as though backing under the trailer preparatory to being coupled thereto, the trailer coupling elements being omitted.

Fig. 2 is an enlarged detail cross sectional view, taken on the line II—II of Fig. 1, but showing one of the supporting members of the supporting leg structure in a raised position.

Fig. 3 is a side elevation of a portion of the tractor trailer combination showing the forward end of the trailer supported by the rear end of the tractor and in coupled position relative to the tractor, but the tractor trailer couple omitted.

Fig. 4 is a similar view showing the manner in which the supporting leg structure is elevated as the rear end of the tractor is backed under the forward end of the trailer, the trailer coupling element being omitted, and Fig. 5 is a plan of a portion of the tractor trailer combination with the tractor and trailer in coupled relation and the supporting leg structure elevated and in an inactive position.

Reference will first be had to Fig. 1, showing a tractor 1 having its rear end provided with a turntable 2 and inclined rails 3 constituting a track leading to the turn table 2. The tractor is provided with a coupler 4 and such mechanism by which the coupler and trailer brakes may be controlled from the cab of the tractor.

The trailer includes a chassis 5 on which is placed a stationary or tiltable body 6 and the rear end of the trailer has a conventional form of rear axle assembly 7, including wheels and a brake mechanism 8 adapted to be operated by hand or by mechanism on the tractor.

The trailer chassis 5 is provided with sets of angularly disposed guideways 9 and 10 having smooth walls and movable in these guideways against the smooth walls thereof are rollers 11 (see Fig. 5) on the ends of transversely disposed axles 12 and 13 carried by triangular side frames 14 forming part of a supporting leg structure which is adapted to engage the ground and cooperate with the rear axle assembly 7 in providing a trailer that may be used independent of the tractor 1. The supporting leg structure is adapted to be raised and lowered within the guideways 9 and 10 causing the leg structure to shift at a defined angle relative to the trailer chassis 5.

At the forward end of the trailer chassis 5 are bearings 15 for the axles or stub shafts 16 of wheels 17 which are adapted to engage the rails 3, when the rear end of the tractor is backed under the forward end of the trailer and cause the forward end of the trailer to be initially elevated relative to the tractor. Pivoted on the axles or stub shafts 16, at the inner ends thereof (see Fig. 5) are supporting members 18 extending rearwardly in the chassis and having the rear ends thereof provided with leg actuating members 19, said members being longitudinally slotted, as at 20, so that the axle 12 of the supporting leg structure may extend through the members 19. The lower walls of the slots 20 are assembled and the upper walls of the slots 20 of said actuating members are formed with a series of notches 21 in which the axle 12 may engage to lock or provide a seated engagement between the supporting members 18 and the supporting leg structure to preclude any danger of the axle 12 riding upwardly in the guideways 10 of the trailer chassis under the influence of a load in the body 6 or on the trailer chassis after the trailer is disengaged from the tractor. The axle 12 has antifrictional rollers 22 in the slotted actuating member 19, these actuating members serving as guideways for the reason that the axle 12 shifts longitudinally of the slots 20 when said axle is being raised by the supporting members 18. The supporting members swing in an arc relative to the forward end of the trailer and cause the supporting leg structure to move at an angle thereto on account of the axles 12 and 13 extending into the inclined guideways 9 and 10 of the trailer chassis. When the supporting leg structure is in an elevated position, the axle rollers 22 bear on the lower smooth walls of the slots 20, and when the supporting leg structure is to be lowered to assume an active position for supporting the forward end of the trailer, independent of the tractor, the supporting leg structure descends by gravity, under control of the members 19 of the supporting members 18 which in turn are controlled by the wheels 28 engaging the rails 3 of the tractor. The ends of the axles 12 and 13 are free to shift in the guideways 9 and 10 and the initial movement of the leg supporting structure carries the ends of the axle 12 out of the notches 21 of the actuating members or guideways 19, so that the ends of the axle 12 are free, and under control of the supporting members 18, may move longitudinally of the slots 20 until the supporting leg structure engages the bottom of the guideways. As soon as the downward movement of the supporting leg structure ceases, by engagement with the ground, further downward movement of the forward end of the trailer chassis brings the notched upper walls of the actuating members 19 into engagement with the axle 12 and prevents the axle from shifting longitudinally of the actuating members or longitudinally of the guideways 10. This is better understood when considering the forward end of the trailer chassis which is constructed so that the load on the forward end of the trailer chassis may be transferred to the supporting members 18 during the coupling action, and these supporting members are equipped for actuation by the rails 3 of the tractor.

Adjacent the forward end of the trailer chassis is the usual transverse member or beam 23 and attached to this transverse member are depending guide members 24 through which extend the supporting members 18. The outer walls of the supporting members 18, in advance of the guide members 24, are provided with hangers 25 having bearings 26 for the axles or shafts 27 of wheels 28 and these wheels are adapted to engage the rails 3 of the tractor, when backed under the trailer and cause the supporting members 18 to be elevated, thereby shifting the supporting leg structure to a raised or inactive position. The hangers 25 are between the supporting members 18 and the trailer chassis 5, and the outer bearing 26 of said hangers are shouldered, as at 29 for engagement with the lower edges of the trailer chassis 5.

After the initial elevation of the forward end of the trailer by the set of wheels 17 engaging the rails 3 of the tractor 1, the set of wheels 28 are brought into engagement with the rails 3 as the rear end of the tractor is backed under the forward end of the trailer. As the wheels 28 roll up the rails 3 the shoulders 29 are carried towards and into engagement with the trailer chassis when the wheels 28 reach the turntable 2, so that the shoulders 29 support said chassis with the wheels 17 elevated and out of engagement with the turntable 2. It will also be noted by reference to Fig. 3, that the supporting members 18 are in engagement with the upper ends of the guide members 24 and this relation is also shown in Fig. 2 of the drawings. The weight of the forward end of the trailer is therefore transferred to the turntable 2 with a fifth wheel action between the tractor and trailer so that the former may turn at an angle to the latter.

From the foregoing it will be observed that the trailer equipment includes a supporting leg structure adapted to be actuated from the forward end of the trailer incident to establishing a combined service relation between the tractor and trailer. The actuation is automatic by reason of the set of wheels 28 engaging the rails 3 of the tractor and in addition to these wheels cooperating with the rails 3 in providing means for raising the supporting leg structure, said wheels also function as an element of a fifth wheel structure for the tractor trailer combination. In view of my former patents particularly Patent No. 1,548,967 dated Aug. 11, 1925, it is thought unnecessary to describe other features of the tractor trailer combination which has been more or less illustrated, particularly in Fig. 5, and while in the drawings there is illustrated a preferred embodiment of my invention, it is to be understood that the structural elements are susceptible to such variations and modifications as fall within the scope of the appended claims.

What I claim is:—

1. The combination of a tractor having a track, a trailer having a rear axle assembly, a shiftable supporting leg structure at the forward end of said trailer, a set of wheels carried by said trailer adapted to engage said tractor track and elevate the forward end of said trailer, another set of wheels at the forward end of said trailer adapted for shifting said supporting leg structure, and coupling means for said tractor and trailer.

2. The combination called for in claim 1, wherein said shiftable supporting leg structure has a portion thereof pivotally supported from the forward end of said trailer and the last mentioned set of wheels located intermediate the ends of said supporting leg structure.

3. The combination of a tractor having a track, a trailer adapted to have its forward end elevated and guided on to said tractor by the track thereof, a coupling for said tractor and trailer, a shiftable supporting leg structure for said trailer when detached from said tractor, and means engageable with said track adapted for shifting said supporting leg structure.

4. The combination called for in claim 3, wherein a portion of said supporting leg structure is swingable in an arc relative to the forward end of said trailer, and said means located adjacent the forward end of said trailer.

5. In tractor trailer combinations, wherein a tractor and trailer are coupled together for combined service and disengageable by uncoupling for independent service, and wherein the coupling and uncoupling operations are rendered active by relative movement of tractor and trailer in direction of traction, and wherein a shiftable supporting leg structure maintains a service condition for said trailer independent of said tractor;—means adapted for shifting said supporting leg structure for a combined tractor trailer service, said means including wheels carried by said leg structure engageable with said tractor.

6. A combination as in claim 5, characterized by a pivotal mounting at the forward end of said trailer with said wheels adjacent said pivotal mounting.

7. A combination as in claim 5, characterized by said wheels sustaining the forward end of the trailer on said tractor during combined tractor trailer service.

8. A combination as in claim 5, characterized by said wheels cooperating with said tractor in forming a fifth wheel action between said tractor and trailer.

9. In tractor trailer combinations wherein a tractor and trailer are coupled together for combined service and disengageable by uncoupling for independent service, and wherein the coupling and uncoupling operations are rendered active by relative movement of tractor and trailer in direction of traction, and wherein a shiftable supporting leg structure, on said trailer provides for independent trailer service, means establishing a fifth wheel action between said tractor and trailer during combined service, said means including trailer elements which initially shift said supporting leg structure as the tractor and trailer are brought together and afford a fifth wheel action when said tractor and trailer are coupled together.

10. A combination as called for in claim 9, characterized by said means including a turn table on said tractor, and on which turntable said trailer elements have a rolling action.

11. In tractor trailer combinations wherein a tractor and trailer are coupled together for combined service and disengageable by uncoupling for independent service, and wherein the coupling and uncoupling operations are rendered active by relative movement of tractor and trailer in direction of traction and wherein a shiftable supporting leg structure on said trailer provides for independent trailer service, means establishing a fifth wheel action between said tractor and trailer during combined service, said means including a turntable on said tractor, a track leading to said turntable, and trailer elements carried by said supporting leg structure adapted to engage said track and move on to said turntable as a combined service condition is established between said tractor and trailer, said trailer elements causing said supporting leg structure to be shifted to an inactive position.

12. A combination as called for in claim 11, wherein said trailer elements are in the form of a set of wheels.

13. In a tractor trailer combination wherein a tractor and trailer are coupled together for combined service and disengageable by uncoupling for independent service, and a shiftable supporting leg structure provides for independent trailer service, means for shifting said leg structure, said means including a tractor part engaged by a portion of said leg structure to elevate it, said tractor part having a portion which cooperates with the said portion of the leg structure in providing a fifth wheel action for said tractor and trailer when coupled together.

14. A tractor, a trailer adapted to have its forward end supported by said tractor for a combined service relation, a shiftable supporting leg structure adapted to support the forward end of the trailer when removed from said tractor, a set of wheels on said trailer for engagement and cooperation with said tractor to raise the forward end of said trailer and its supporting leg structure, and another set of wheels at the forward end of said trailer brought into action after the first mentioned set of wheels to shift said leg structure relative to said trailer.

15. A tractor and trailer as called for in claim 14, wherein the last mentioned set of wheels cooperates with said tractor in providing a fifth wheel action between said tractor and trailer.

16. A tractor and trailer as called for in claim 14, wherein said supporting leg structure has a portion pivoted at the first mentioned set of wheels and support the second mentioned set of wheels adjacent such pivot.

17. A trailer, a supporting leg structure for the forward end of said trailer, a tractor having a track, coupling means for said tractor and trailer, means for elevating the forward end of said trailer relative to said tractor and elevating said leg structure relative to said trailer, said means including wheels, one brought into action in advance of the other by engagement with said tractor track when establishing a coupled relation between said tractor and trailer.

18. A tractor and trailer as called for in claim 17, wherein one of said wheels sustains the weight of the forward end of said trailer relative to said tractor.

19. In a tractor trailer combination, a trailer adapted for independent serivce, a shiftable supporting leg structure for the forward end of said trailer, said leg structure having its forward portion pivotally connected to the forward end of said trailer, a tractor adapted to be backed under the forward end of said trailer and coupled thereto for combined service, and means on said tractor to engage under said supporting leg structure and elevate said leg structure relative to said trailer.

20. A tractor trailer combination as called for in claim 19, wherein the rear end of said supporting leg structure slidably engages said trailer and is adapted for an automatic fixed engagement with said trailer during independent service.

21. A tractor trailer combination as called for in claim 19, wherein said tractor means causes an initial elevation of the forward end of said trailer in advance of the elevation of said supporting leg structure.

22. In a tractor trailer combination, a trailer, a tractor adapted to be backed under said trailer to establish a combined service relation, a shiftable supporting leg structure for said trailer providing an independent trailer service condition, trailer wheels to facilitate backing said tractor under said trailer, and a set of wheels brought into action to sustain the trailer on said tractor, said leg structure being operatable by said set of wheels to establish the combined service relation of said tractor and trailer.

23. In a tractor trailer combination, a trailer, a tractor adapted to have its rear end backed under the forward end of said trailer and coupled thereto, trailer wheels adapted to support the forward end of said trailer on the rear end of said tractor preparatory to coupling said tractor and trailer, a set of wheels adapted to supplant the trailer wheels and sustain the trailer on the tractor, means adapted for supporting the forward end of the trailer independent of said tractor, said means being shiftable by said set of wheels when backing said tractor relative to said trailer for coupling purposes.

24. A tractor trailer combination as called for in claim 23, wherein a portion of said means is swingable in an arc relative to the forward end of said trailer, and another portion is adapted for an automatic fixed engagement with said trailer for load sustaining purposes.

25. In a tractor trailer combination, a trailer comprising a chassis, a rear axle assembly supporting the rear end of said chassis, angular guideways on said chassis, a leg structure slidably supported in said guideways and adapted for supporting the forward end of said chassis, chassis supporting members carried by said chassis and loosely engaging said leg structure to raise said leg structure in said guideways relative to said chassis; a tractor adapted to extend under the forward end of said trailer chassis and raise said supporting members, and coupling means for said tractor and trailer.

26. A tractor trailer combination as called for in claim 25, wherein said leg structure includes an axle, and notched guideways on said supporting members to engage said axle to prevent slippage of said leg structure under trailer load conditions.

27. In a tractor trailer combination wherein a tractor is adapted to be coupled to a trailer, said trailer being operatable independent of said tractor and comprising a chassis, an axle assembly supporting the rear end of said chassis, a leg structure slidably supported by said chassis adjacent the forward end thereof, and supporting members pivotally attached to the forward end of said chassis and articulated with said leg structure for shifting said leg structure when a tractor is backed under said supporting members incident to coupling said tractor and trailer together.

28. A tractor trailer combination as called for in claim 27, wherein the weight of the forward end of the chassis is sustained by the forward pivoted ends of said supporting members and transferred through said supporting members to said leg structure when said trailer is operated independent of said tractor.

29. In a tractor trailer combination wherein a tractor is adapted to have its rear end backed under the forward end of a trailer and coupled thereto, and wherein said trailer is operatable independent of said tractor, said trailer comprising a chassis, a rear axle assembly for said chassis, a shiftable leg structure bodily slidable adjacent the forward end of said chassis, supporting members extending from the forward end of said chassis to said leg structure for sliding it relative to said chassis, and tractor engaged wheels on said supporting members whereby backing of said tractor under said trailer causes said leg structure to be shifted relative to said chassis.

30. A tractor trailer combination as called for in claim 29 wherein said leg structure and said supporting members are articulated so that said supporting members may swing in an arc and said leg structure move at a constant angle relative to said chassis.

31. In a tractor trailer combination wherein a tractor is adapted to be coupled to a trailer and said trailer has a leg structure by which said trailer may be used independent of said tractor, and wherein said leg structure may be raised and lowered by movement of said tractor relative to said trailer incident to coupling and uncoupling said tractor and trailer:—said leg structure including an axle slidable relative to said trailer, supporting members adapted for shifting said axle, said supporting members being pivoted and adapted to be engaged by a tractor, and a connection between said axle and supporting members by which said axle automatically moves into seated engagement with said supporting members.

32. A tractor trailer combination as called for in claim 31 characterized by trailer guideways for said axle and notched guideways on said supporting member and in which guideways said axle is seated.

33. In a tractor trailer combination wherein a tractor is adapted to be coupled to a trailer and said trailer has a leg structure by which said trailer may be used independent of said tractor, and wherein said leg structure may be raised and lowered by movement of said tractor relative to said trailer incident to coupling and uncoupling said tractor and trailer:—means adapted for raising said leg structure, said means comprising supporting members pivotally connected to the forward end of the trailer and adapted to be raised by the tractor into a weight sustaining relation to said trailer, and a connection between said supporting members and said leg structure which locks said leg structure against displacement relative to said supporting members.

34. A trailer adapted to be pulled by a tractor, a rear axle assembly supporting the rear end of said trailer, a shiftable supporting leg structure for the forward end of said trailer, guideways on said trailer to cause said leg structure to be shifted in a defined direction, said leg structure including an axle, movable guideways engaging the axle of said leg structure and adapted for shifting said leg structure, means carried by said trailer to facilitate moving said movable guideways, and tractor means adapted to slide under said means to effect movement of said movable guideways and said leg structure.

35. A trailer as called for in claim 34 wherein the first mentioned means includes a set of wheels movably supported from said trailer.

In testimony whereof I affix my signature.

SIDNEY B. WINN.